United States Patent
Doyle et al.

(10) Patent No.: US 11,693,978 B2
(45) Date of Patent: *Jul. 4, 2023

(54) SECURE HARDWARE THREAT PROTECTION

(71) Applicant: International Business Machines Corporation, Armonk, NY (US)

(72) Inventors: Matthew Doyle, Chatfield, MN (US); Gerald Bartley, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 136 days.

This patent is subject to a terminal disclaimer.

(21) Appl. No.: 17/303,880

(22) Filed: Jun. 9, 2021

(65) Prior Publication Data

US 2021/0303708 A1 Sep. 30, 2021

Related U.S. Application Data

(63) Continuation of application No. 16/394,816, filed on Apr. 25, 2019, now Pat. No. 11,062,039.

(51) Int. Cl.
  *G06F 21/62* (2013.01)
  *G06F 1/30* (2006.01)
  (Continued)

(52) U.S. Cl.
  CPC .............. *G06F 21/62* (2013.01); *G06F 1/30* (2013.01); *G06F 13/1668* (2013.01);
  (Continued)

(58) Field of Classification Search
  CPC ........ G06F 21/62; G06F 1/30; G06F 13/1668; G06F 13/4282; G06F 21/602;
  (Continued)

(56) References Cited

U.S. PATENT DOCUMENTS 9,525,193 B2 12/2016 Lee
10,729,030 B1 7/2020 Cousineau
(Continued)

OTHER PUBLICATIONS

"Hardware Security Modules as PCIe card—Ultimaco HSM" Published Apr. 27, 2019 as verified by Internet Archive (5 pages) http://web.archive.org/web/20190427203206/https://hsm.utimaco.com/products-hardware-security-mod u les/form-factor/pcie-card/ (Year: 2019).

(Continued)

*Primary Examiner* — Joseph P Hirl
*Assistant Examiner* — Thomas A Gyorfi
(74) *Attorney, Agent, or Firm* — Nathan M. Rau

(57) ABSTRACT

A printed circuit (PC) card apparatus can, in an absence of external power provided to a Peripheral Component Interconnect Express (PCIe) PC card, prevent and detect unauthorized access to secure data stored on a memory device mounted on the PCIe PC card. The PCIe card includes a primary battery to supply, when external power is disconnected from the PCIe card, power to an electronic security device mounted on the PCIe card. The PC card apparatus also includes a PCIe edge connector protector enclosing electrically conductive fingers of a PCIe edge card connector. The PCIe edge connector protector includes a hidden supplemental charge storage device integrated into the PCIe edge connector protector. The PCIe edge connector protector also includes electrically conductive contacts to transfer supplemental power from the supplemental charge storage device to the electronic security device.

12 Claims, 3 Drawing Sheets

(51) Int. Cl.
  G06F 13/16 (2006.01)
  G06F 13/42 (2006.01)
  H01R 12/73 (2011.01)
  H01R 12/70 (2011.01)
  H01R 13/66 (2006.01)
  H05K 1/11 (2006.01)
  *G06F 21/60* (2013.01)

(52) U.S. Cl.
  CPC ..... *G06F 13/4282* (2013.01); *H01R 12/7082* (2013.01); *H01R 12/7088* (2013.01); *H01R 12/737* (2013.01); *H01R 13/6675* (2013.01); *H05K 1/117* (2013.01); *G06F 21/602* (2013.01); *G06F 21/6245* (2013.01); *G06F 2213/0026* (2013.01); *H05K 2201/10037* (2013.01); *H05K 2201/10159* (2013.01)

(58) Field of Classification Search
  CPC ......... G06F 21/6245; G06F 2213/0026; G06F 1/185; G06F 21/78; G06F 21/85; G06F 21/86; H01R 12/7082; H01R 12/7088; H01R 12/737; H01R 13/6675; H05K 1/117; H05K 2201/10037; H05K 2201/10159; H05K 1/0275
  See application file for complete search history.

(56) References Cited

U.S. PATENT DOCUMENTS

| | | | | |
|---|---|---|---|---|
| 11,062,039 | B2* | 7/2021 | Doyle | G06F 21/86 |
| 2015/0370665 | A1 | 12/2015 | Cannata | |
| 2016/0181712 | A1 | 6/2016 | Wig | |
| 2017/0011002 | A1 | 1/2017 | Shin | |
| 2017/0288876 | A1 | 10/2017 | Dragone | |
| 2018/0114039 | A1 | 4/2018 | Sion | |
| 2018/0276421 | A1 | 9/2018 | Sion | |
| 2019/0205573 | A1 | 7/2019 | Couillard | |
| 2020/0159682 | A1 | 5/2020 | Allo | |

OTHER PUBLICATIONS

"IBM 4765 PCIe Cryptographic Coprocessor" Published May 2011 (6 pages) http://public.dhe.ibm.com/security/cryptocards/pciecc/CCA/PCIe_Spec_Sheet.pdf (Year: 2011).

"Security Requirements for Cryptographic Modules," Federal Information Processing Standards Publication, FIPS PUB 140-2, Mar. 25, 2001, 69 pages, Information Technology Laboratory, National Institute of Standards and Technology, Gaithersburg, MD.

Fujimoto et al., "Comparing the power of full disk encryption alternatives." 2012 International Green Computing Conference (IGCC). IEEE, 2012.

Hu, "Solving today's design security concerns." Xilinx Corporation (2010), https://citeseerx.ist.psu.edu/viewdoc/download? doi=10.1.1.169.2063&rep=rep 1&type=pdf.

List of IBM Patents or Patent Applications Treated as Related, signed Jun. 9, 2021.

Nash et al. "Towards an intrusion detection system for battery exhaustion attacks on mobile computing devices." Pervasive Computing and Communications Workshops, 2005. PerCom 2005 Workshops. Third IEEE International Conference on. IEEE, 2005.

Netto, Eduardo & Vaslin, R & Crenne, J & Cotret, Pascal & Gogniat, Guy & Diguet, Jean-Philippe & Danger, Jean-Luc & Maurine, Philippe & Fischer, V & Badrignans, Benoit & Barthe, L & Benoit, P & Torres, Lionel. (2011). Security FPGA Analysis. 10.1007/978-94-007-1338-3_2.

Obermaier et al. "An embedded key management system for PUF-based security enclosures." 2018 7th Mediterranean Conference on Embedded Computing (MECO). IEEE, 2018.

* cited by examiner

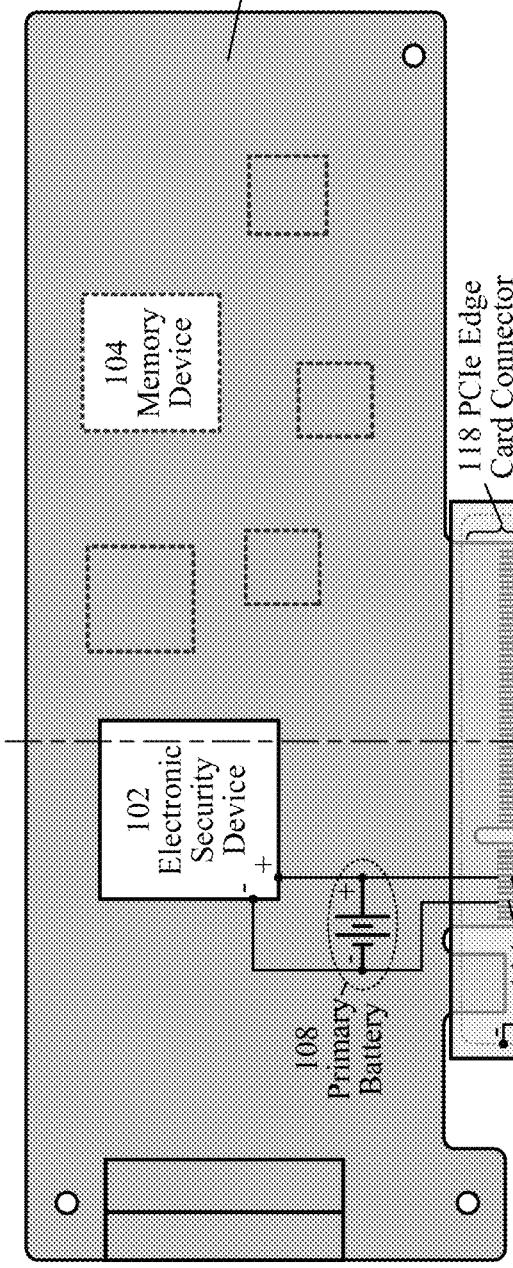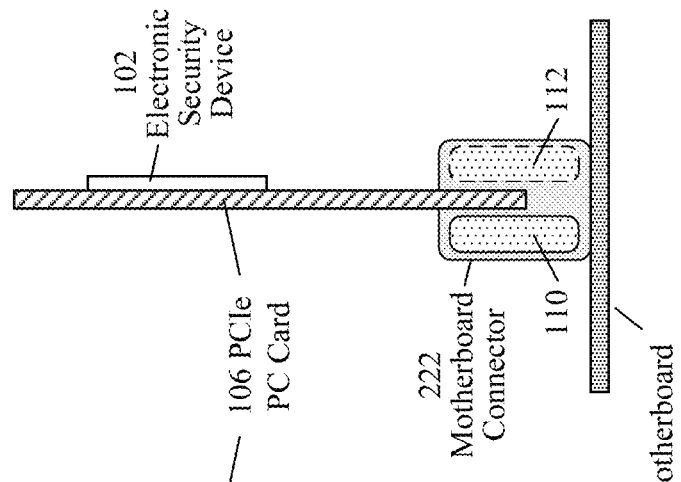
FIG. 2

SECURE HARDWARE THREAT PROTECTION

BACKGROUND

The present disclosure generally relates to electronic data security. In particular, this disclosure relates to providing enduring power to an electronic security device configured to ensure the security of data on a memory device.

The widespread use of computers and electronic systems, especially computers interconnected by networks such as the Internet, has caused data represented electronically to become ubiquitous. Electronic data can include a variety of file formats such as text, word processing documents, graphics data, still images, audio tracks and video data.

A wide range of information content, including "sensitive" information items can be represented electronically. Sensitive information can include any type of information or knowledge that might result in loss of an advantage or level of security if disclosed to others. Loss, misuse, modification or corruption of, or unauthorized access to sensitive information can adversely affect the privacy, reputation, finances or welfare of an individual, and trade secrets, reputation, and finances of a business, depending on the level of sensitivity and nature of the information.

The intangible nature of electronic data, in conjunction with the potential ease of undetected data copying, theft or corruption, can lead to a variety of data protection methods and devices can be employed to protect sensitive data. Data protection methods and devices can be adapted and/or employed to provide a level of data protection suitable to the device containing the data such as a memory chip or hard disk drive, or media such as a cable or free space, through which the data is transmitted. In certain applications, a combination of data protection methods or devices such as physically securing equipment containing data and encrypting data using an encryption algorithm, can be employed to provide a level of protection greater than the use of a single method or device.

SUMMARY

Embodiments can be directed towards a printed circuit (PC) card apparatus configured to, in an absence of external power provided to a Peripheral Component Interconnect Express (PCIe) PC card, prevent and detect unauthorized access to secure data stored on a memory device mounted on the PCIe PC card. The PC card apparatus includes the PCIe card. The PCIe card includes a primary battery configured to supply, when external power is disconnected from the PCIe card, power to an electronic security device mounted on the PCIe card. The PCIe card also includes a PCIe edge card connector. The PC card apparatus also includes a PCIe edge connector protector enclosing electrically conductive fingers of the PCIe edge card connector. The PCIe edge connector protector includes a supplemental charge storage device that is hidden from view and that is integrated into the PCIe edge connector protector. The PCIe edge connector protector also includes electrically conductive contacts configured to transfer supplemental power from the supplemental charge storage device to the electronic security device by completing, through contacting corresponding electrically conductive fingers of the PCIe edge connector, an electrical circuit between the supplemental charge storage device and the security device.

Embodiments can also be directed towards a PC card apparatus configured to, in an absence of external power provided to a PCIe PC card, prevent and detect unauthorized access to secure data stored on a memory device mounted on the PCIe PC card. The PC card apparatus includes the PCIe card. The PCIe card includes a primary battery configured to supply, when external power is disconnected from the PCIe card, power to an electronic security device mounted on the PCIe card. The PCIe card also includes a PCIe edge card connector. The PC card apparatus also includes a motherboard connector attached to a motherboard and enclosing electrically conductive fingers of the PCIe edge card connector. The motherboard connector includes a supplemental charge storage device that is hidden from view and that is integrated into the motherboard connector. The motherboard connector also includes electrically conductive contacts configured to transfer supplemental power from the supplemental charge storage device to the electronic security device by completing, through contacting corresponding electrically conductive fingers of the PCIe edge connector, an electrical circuit between the supplemental charge storage device and the security device.

Embodiments can also be directed towards a PC card apparatus configured to, in an absence of external power provided to a PCIe PC card, prevent and detect unauthorized access to secure data stored on a memory device mounted on the PCIe PC card. The PC card apparatus includes the PCIe card, inserted into a stacking connector. The PCIe card includes a primary battery configured to supply, when external power is disconnected from the PCIe card, power to an electronic security device mounted on the PCIe card. The PCIe card also includes a PCIe edge card connector. The PC card apparatus also includes the stacking connector, inserted into a motherboard connector attached to a motherboard and enclosing electrically conductive fingers of the PCIe edge card connector. The stacking connector includes a supplemental charge storage device that is hidden from view and that is integrated into the stacking connector. The stacking connector also includes electrically conductive contacts configured to transfer supplemental power from the supplemental charge storage device to the electronic security device by completing, through contacting corresponding electrically conductive fingers of the PCIe edge connector, an electrical circuit between the supplemental charge storage device and the security device.

The above summary is not intended to describe each illustrated embodiment or every implementation of the present disclosure.

BRIEF DESCRIPTION OF THE DRAWINGS

The drawings included in the present application are incorporated into, and form part of the specification. They illustrate embodiments of the present disclosure and, along with the description, serve to explain the principles of the disclosure. The drawings are only illustrative of certain embodiments and do not limit the disclosure.

FIG. 2 includes a side view and a cross-sectional view of a PC card apparatus with a motherboard connector, according to embodiments consistent with the figures.

Figure 1:
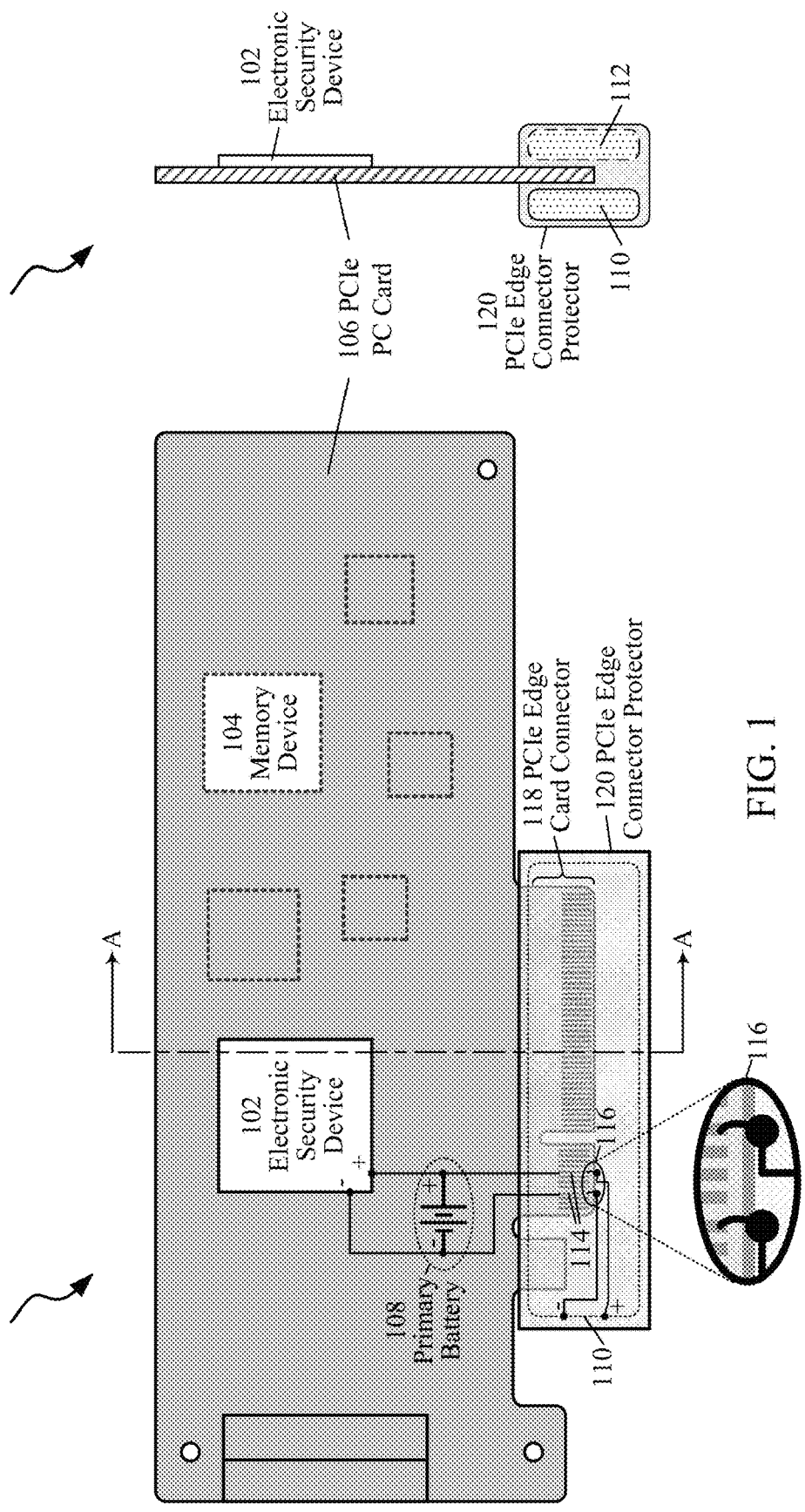
FIG. 1 includes a side view and a cross-sectional view of a printed circuit (PC) card apparatus with a Peripheral Component Interconnect Express (PCIe) edge connector protector, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

Certain embodiments of the present disclosure can be appreciated in the context of providing enhanced tamper detection and prevention for electronic equipment such as hardware security modules (HSMs), which can be used to provide data encryption services for servers. Such servers can include, but are not limited to web servers, application servers, mail servers, and virtual servers. While not necessarily limited thereto, embodiments discussed in this context can facilitate an understanding of various aspects of the disclosure. Certain embodiments can also be directed towards other equipment and associated applications, such as providing enhanced tamper detection and prevention for electronic equipment such as HSMs used in computing systems, which can be used in a wide variety of computational and data processing applications. Such computing systems can include, but are not limited to, supercomputers, high-performance computing (HPC) systems, and other types of special-purpose computers.

For ease of discussion, the term "supplemental charge storage device" is used herein, with reference to an electrical or electrochemical device that can be used to supply power to an electronic device. It can be understood that, in the context of the present disclosure, the terms "supplemental charge storage device" and "battery" can be used interchangeably, in reference to such a device, with the understanding that a charge storage device can, in certain embodiments, also be used to refer to a device such as a supercapacitor.

An HSM is a physical computing device that can be used to provide cryptoprocessing, and which can safeguard and manage sensitive digital encryption keys used for strong authentication. HSMs can be implemented in the form of a plug-in printed circuit (PC) card that attaches directly to a computer or network server, for example. A memory device such as a memory chip or memory module mounted on the PC card can be used to store sensitive data such as digital encryption keys. HSMs can be often used as components of a mission-critical systems such as a public key infrastructure or applications involving sensitive data such as government/military or financial data. The sensitive data contained within a memory device of an HSM can require a high degree of security and protection.

HSMs can include devices and features that provide evidence, e.g., visible or electrical indications of tampering, or electronic tamper logging and alerting. HSMs can also include devices and features that provide tamper resistance and/or responsiveness, which can make tampering difficult without rendering the HSM inoperable. For example, an HSM can respond to detected tampering by deleting encryption keys contained within an on-card memory device.

An HSM can contain one or more electronic security devices, e.g., cryptoprocessor chips, that can be used in the prevention of tampering and bus probing. Such an electronic security device, e.g., integrated circuit (IC), can require a supply of continuous power in order to perform these functions. When an HSM is included within an electronic system that is active, such power can be supplied by the system itself. When the HSM is not included within a functioning electronic system, or the electronic system is powered down, continuous power can be supplied by the HSM, i.e., the electronic security device, by one or more batteries integrated into the HSM.

A required time period for the electronic security device of an HSM to operate without externally supplied power can be specified by various specifications or standards. For example, the Federal Information Processing Standard (FIPS) Publication 140-2 stipulates that the electronic security device of an HSM must operate for a period of not less than five years when it is not receiving external power from an electronic system or other source. The electronic security devices on certain HSMs, however, can have an active operating time that is less that the stipulated five years. For example, with battery types and sizes that can be practically integrated into an HSM card, an active operating time can be limited to three years or less. Accordingly, there can be a need to extend the operating time of certain HSMs in order to meet the above-referenced five-year operating period.

Embodiments of the present disclosure are directed towards an apparatus that can provide charge-storage capability that can be useful, in conjunction with charge-storage capability integrated within an HSM, to extend the operating time of the HSM to at least five years. Embodiments of the present disclosure can be useful for including cost-effective extended-time tampering detection and prevention, for use with HSMs, by using existing and proven design methodologies, printed circuit board (PCB), battery, and IC technologies. A PC card apparatus designed according to certain embodiments can be compatible with existing and proven electronic systems, and can be a useful and cost-effective way to provide extended active protection intervals to HSMs. A PC card apparatus designed according to embodiments of the present disclosure can be installed and operated within an existing electronic system.

Certain embodiments relate to providing supplemental power to HSMs, e.g., PC cards, that require enduring, continuous power to enable an electronic security device to operate for an extended time period without a supply of external power. FIG. 1 includes a side view 100 and a cross-sectional view 150 of a PC card apparatus with a Peripheral Component Interconnect Express (PCIe) edge connector protector 120, according to embodiments of the present disclosure. In embodiments, a supplemental charge storage device 110 can be particularly useful in providing a supplemental amount of stored charge that can extend an operating life of the PC card apparatus 100 to at least five years. Such an extended operating life can be useful in preventing and detecting attempts at unauthorized access to sensitive data stored on memory device 104.

The PC card apparatus 100 includes PCIe PC card 106 which includes electronic security device 102 and memory device 104 mounted on a face(s) of the card. PC card apparatus 100 also includes primary battery 108, which is electrically connected to provide enduring, continuous power to electronic security device 102. For ease of illustration and discussion, FIG. 1 depicts PC card 106 as a PCIe card, as many current HSMs have a PCIe add-in card form-factor. This depiction, however, should not be construed as limiting. PC card 106 can be implemented in a variety of PC card form-factors and designed in accordance with a variety of design/interface standards. An HSM such as PC card 106 designed as a PCIe card can have a limited size, with a relatively small usable area available for a battery, e.g., primary battery 108, for providing power to the card when it is not receiving power from a host system.

Figure 3:
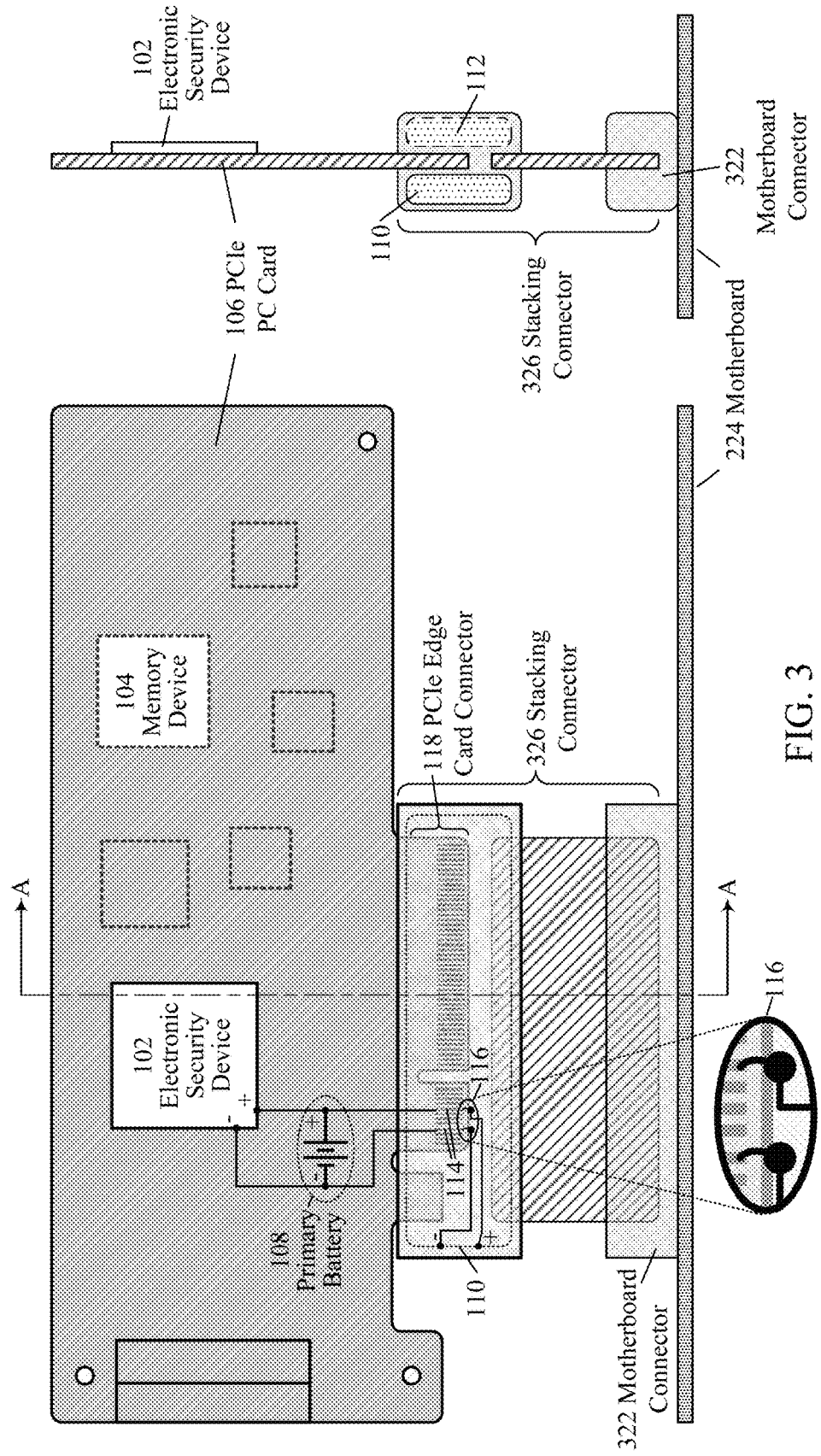
FIG. 3 includes a side view and a cross-sectional view of a PC card apparatus with a stacking connector, according to embodiments consistent with the figures.

A primary battery 108 can be electrically connected, as depicted, to supply, when external power is disconnected from the PCIe PC card 106, power to the electronic security device 102. In some HSMs, primary battery 108 is concealed from view, and in some HSMs, primary battery 108 is not concealed. The schematic symbol of primary battery 108, as depicted in FIGS. 1-3, is used to represent a battery which, in some embodiments, can have a variety of physical locations on a face of PCIe PC card 106, and in some embodiments, can be concealed within PCIe PC card 106. Similarly, the lines interconnecting electrically conductive fingers 114, primary battery 108, and electronic security device 102 can be used to represent conductive trace wires on or within PCIe PC card 106.

Electronic security device 102 can be understood to be consistent with electronic security devices discussed above and memory device 104 is similarly consistent with memory devices discussed above. PCIe PC card 106 also includes PCIe edge card connector 118 with electrically conductive fingers 114 on an edge of the card 106. Certain electrically conductive fingers 114 can be useful in providing power to electronic security device 102 from an external power source, e.g., supplemental charge storage device 110. In embodiments, PCIe edge card connector 118 is inserted into PCIe edge connector protector 120, which encloses enclosing electrically conductive fingers 114 of the PCIe edge card connector 118.

In embodiments, the supplemental charge storage device 110 can be concealed from view, as depicted in view 100 and 150, and is integrated into the PCIe edge connector protector 120. The body of PCIe edge connector protector 120 can be fabricated from a variety of types of molded plastics and other materials consistent with materials used in the fabrication of PCIe and other types of edge-card connectors. Electrically conductive contacts 116 are configured to transfer supplemental power from the supplemental charge storage device 110 to the electronic security device 102. Electrically conductive contacts 116 can complete, through contacting corresponding electrically conductive fingers 114 of the PCIe edge card connector 118, an electrical circuit between the supplemental charge storage device 110 and the electronic security device 102. Electrically conductive contacts 116 are generally consistent with contacts included in PCIe card edge connectors.

In the practice of the present disclosure, PCIe PC card 106 can be stored for extended periods with PCIe edge connector protector 120 installed, as depicted in FIG. 1. The use of PCIe edge connector protector 120 can allow the PCIe PC card 106 to be stored outside of a "host" system or other active operating environment for extended periods. The charge storage capacity of supplemental charge storage device 110 can be useful in augmenting the on-board primary battery 108 and ensuring an at least five year operating lifespan, in the absence of externally supplied power, for the electronic security device 102. An HSM designer can specify a particular size of PCIe edge connector protector 120 in order to accommodate particular size(s) of supplemental charge storage device(s) 110 that may be needed to provide sufficient stored charge.

According to embodiments, supplemental charge storage device 110 can be a nickel metal hydride (NiMH) battery, a lithium-ion (Li-ion) battery, an alkaline battery, or a battery having another type of chemistry. In some embodiments, supplemental charge storage device 110 can be a supercapacitor, or suitable configuration of various types of batteries and/or supercapacitor(s). Batteries and/or supercapacitors can include custom and/or off-the-shelf designs, and can have a range of physical dimensions suitable for being integrated within a PCIe edge connector protector 120. In the practice of the present disclosure, a HSM designer can select one or more supplemental charge storage device(s) based on various physical and electrical characteristics. Such characteristics can include but are not limited to: physical size, charge capacity, internal leakage, self-discharge characteristics, cost, and the like, and can be chosen in order to ensure an overall HSM operating interval of at least five years.

By way of example, a electronic security device 102 can draw a relatively small amount of "standby" current, for example, 50 µA, nominally. If supplemental charge storage device 110 has a charge storage capacity of at least 1,500 mAh, for example, then the supplemental charge storage device 110 could be sufficient to supply the electronic security device 102 with standby current for a period of approximately 28 months. This additional operating time can be particularly useful in extending the operating time, without an external power source, of a PC card apparatus from three years to five years, in accordance with specifications such as are contained in Federal Information Processing Standard (FIPS) Publication 140-2.

In some embodiments, a single supplemental charge storage device 110 can be used to supply long-term standby power to electronic security device 102. In some embodiments, multiple supplemental charge storage devices, e.g., 110 and 112, can be used to supply electronic security device 102. An HSM designer can specify the interconnection of multiple supplemental charge storage devices, in various configurations, in accordance with the voltage and current requirements of particular electronic security device(s) 102. One or more supplemental charge storage device can be configured to provide various supply voltages, for example, 3.3 V, 5 V or 12 V, in accordance with supply voltage specifications of particular electronic security device(s) 102.

FIG. 2 includes a side view 200 and a cross-sectional view 250 of a PC card apparatus with a motherboard connector 222 attached to a motherboard 224, according to embodiments consistent with the figures. In embodiments, a supplemental charge storage device 110 can be particularly useful in providing a supplemental amount of stored charge that can extend an operating life of the PC card apparatus 100 to at least five years. Such an extended operating life can be useful in preventing and detecting attempts at unauthorized access to sensitive data stored on memory device 104.

The PC card apparatus with motherboard connector, as depicted in views 200 and 250, is generally consistent with PC card apparatus with PCIe edge connector protector, as depicted in views 100 and 150. Aspects such as structure, function, electrical and physical characteristics, performance, and limitations of PCIe PC card 106, including electronic security device 102, memory device 104, primary battery 108 and PCIe edge card connector 118, are generally consistent with those described above in reference to FIG. 1.

In embodiments, the supplemental charge storage device 110 can be concealed from view, as depicted in view 200 and 250, and is integrated into the motherboard connector 222. The body of the motherboard connector 222 can be fabricated from a variety of types of molded plastics and other materials consistent with materials used in the fabrication of motherboard connectors and other types of edge-card connectors. Certain electrically conductive contacts 116 are configured to transfer supplemental power from the supplemental charge storage device 110 to the electronic security device 102. Certain electrically conductive contacts 116 can complete, through contacting corresponding electrically conductive fingers 114 of the PCIe edge card connector 118, an electrical circuit between the supplemental charge storage device 110 and the electronic security device 102. Electrically conductive contacts 116 are generally consistent with contacts included in motherboard connectors. Accordingly, certain electrically conductive contacts 116 are configured to be used to conduct signals and power between motherboard 224 and certain electrically conductive fingers 114.

In the practice of the present disclosure, PCIe PC card 106 can be stored for extended periods while inserted into motherboard connector 222, as depicted in FIG. 2. The use of motherboard connector 222 can allow the PCIe PC card 106 to be stored inside of a powered off "host" system, e.g., a computer or server, or other inactive operating environment for extended periods. An HSM designer can specify a particular size of motherboard connector 222 in order to accommodate particular size(s) of supplemental charge storage device(s) 110 that can be needed to provide sufficient stored charge. In some embodiments, a single supplemental charge storage device 110 can be used to supply long-term standby power to electronic security device 102. In some embodiments, multiple supplemental charge storage devices, e.g., 110 and 112, can be used to supply electronic security device 102.

FIG. 3 includes a side view 300 and a cross-sectional view 350 of a PC card apparatus with a stacking connector 326 attached to a motherboard 224, according to embodiments consistent with the figures. In embodiments, a supplemental charge storage device 110 can be particularly useful in providing a supplemental amount of stored charge that can extend an operating life of the PC card apparatus 100 to at least five years. Such an extended operating life can be useful in preventing and detecting attempts at unauthorized access to sensitive data stored on memory device 104.

The PC card apparatus with stacking connector, as depicted in views 300 and 350, is generally consistent with the PC card apparatuses depicted in views 100, 150, 200 and 250. Aspects such as structure, function, electrical and physical characteristics, performance and limitations of PCIe PC card 106, including electronic security device 102, memory device 104, primary battery 108 and PCIe edge card connector 118, are generally consistent with those described above in reference to FIGS. 1 and 2.

In embodiments, the supplemental charge storage device 110 can be concealed from view, as depicted in view 300 and 350, and is integrated into the stacking connector 326. The body of the stacking connector 326 can be fabricated from a variety of types of molded plastics and other materials consistent with materials used in the fabrication various types of edge-card connectors. In embodiments, stacking connector 326 can include a portion that can receive and enclose electrically conductive fingers 114 of a PCIe edge card connector 118, and a portion that can be inserted into another PCIe-compatible connector, for example, motherboard connector 322.

Certain electrically conductive contacts 116 are configured to transfer supplemental power from the supplemental charge storage device 110 to the electronic security device 102. Certain electrically conductive contacts 116 can complete, through contacting corresponding electrically conductive fingers 114 of the PCIe edge card connector 118, an electrical circuit between the supplemental charge storage device 110 and the electronic security device 102. Electrically conductive contacts 116 are generally consistent with contacts included in stacking and interposer connectors. Accordingly, certain electrically conductive contacts 116 are configured to be used to conduct signals and power between motherboard 224 and certain electrically conductive fingers 114.

In the practice of the present disclosure, PCIe PC card 106 can be stored for extended periods while inserted into stacking connector 326, which is in turn, inserted into motherboard connector 222. Motherboard connector 222 is attached to motherboard 224, as depicted in FIG. 3. The use of stacking connector 326 can allow the PCIe PC card 106 to be stored inside of a powered-off "host" system or other inactive operating environment for extended periods. The charge storage capacity of supplemental charge storage device 110 can be useful in augmenting the on-board primary battery 108 and ensuring an at least five year operating lifespan, in the absence of externally supplied power, for the electronic security device 102. An HSM designer can specify a particular size of stacking connector 326 in order to accommodate particular size(s) of supplemental charge storage device(s) 110 that may be needed to provide sufficient stored charge. A stacking connector 326 can, in some embodiments, provide a relatively large internal volume in which to incorporate one or more supplemental charge storage devices 110 and/or 112. In some embodiments, a single supplemental charge storage device 110 can be used to supply long-term standby power to electronic security device 102. In some embodiments, multiple supplemental charge storage devices, e.g., 110 and 112, can be used to supply electronic security device 102.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A printed circuit (PC) card apparatus comprising:
   a Peripheral Component Interconnect Express (PCIe) card, including:
      a primary battery configured to supply power to an electronic security device mounted on the PCIe card; and
      a PCIe edge card connector; and
   a PCIe edge connector protector including:
      a supplemental charge storage device integrated into the PCIe edge connector protector; and
      electrically conductive contacts configured to transfer supplemental power from the supplemental charge storage device to the electronic security device by completing, an electrical circuit between the supplemental charge storage device and the security device.

2. The PC card apparatus of claim 1, wherein the supplemental charge storage device is selected from the group consisting of: a nickel metal hydride (NiMH) battery, a lithium-ion (Li-ion) battery, an alkaline battery, and a supercapacitor.

3. The PC card apparatus of claim 1, wherein the supplemental charge storage device has a charge storage capacity of at least 1,500 mAh.

4. The PC card apparatus of claim 1, wherein the charge storage capacity of the supplemental charge storage device, in conjunction with charge storage capacity of the primary battery, is sufficient to supply electrical power to enable operation, in the absence of externally supplied power, of the security device for a time interval of at least five years.

5. A printed circuit (PC) card apparatus comprising:
a Peripheral Component Interconnect Express (PCIe) card, including:
  a primary battery configured to supply power to an electronic security device mounted on the PCIe card; and
  a PCIe edge card connector; and
a motherboard connector on a motherboard including:
  a supplemental charge storage device integrated into the motherboard connector; and
  electrically conductive contacts configured to transfer supplemental power from the supplemental charge storage device to the electronic security device by completing an electrical circuit between the supplemental charge storage device and the security device.

6. The PC card apparatus of claim 5, wherein the supplemental charge storage device is selected from the group consisting of: a nickel metal hydride (NiMH) battery, a lithium-ion (Li-ion) battery, an alkaline battery, and a supercapacitor.

7. The PC card apparatus of claim 5, wherein the supplemental charge storage device has a charge storage capacity of at least 1,500 mAh.

8. The PC card apparatus of claim 5, wherein the charge storage capacity of the supplemental charge storage device, in conjunction with charge storage capacity of the primary battery, is sufficient to supply electrical power to enable operation, in the absence of externally supplied power, of the security device for a time interval of at least five years.

9. A printed circuit (PC) card apparatus comprising:
a Peripheral Component Interconnect Express (PCIe) card, inserted into a stacking connector, the PCIe card including:
  a primary battery configured to supply power to an electronic security device mounted on the PCIe card; and
  a PCIe edge card connector; and
the stacking connector, inserted into a motherboard connector, the stacking connector including:
  a supplemental charge storage device integrated into the stacking connector; and
  electrically conductive contacts configured to transfer supplemental power from the supplemental charge storage device to the electronic security device by completing an electrical circuit between the supplemental charge storage device and the security device.

10. The PC card apparatus of claim 9, wherein the supplemental charge storage device is selected from the group consisting of: a nickel metal hydride (NiMH) battery, a lithium-ion (Li-ion) battery, an alkaline battery, and a supercapacitor.

11. The PC card apparatus of claim 9, wherein the supplemental charge storage device has a charge storage capacity of at least 1,500 mAh.

12. The PC card apparatus of claim 9, wherein the charge storage capacity of the supplemental charge storage device, in conjunction with charge storage capacity of the primary battery, is sufficient to supply electrical power to enable operation, in the absence of externally supplied power, of the security device for a time interval of at least five years.

* * * * *